United States Patent
Mercer, Jr.

[15] 3,698,269
[45] Oct. 17, 1972

[54] MACHINE TOOLS, PARTICULARLY A DEVICE FOR BAR FEED MECHANISM AND A BAR FEED MECHANISM

[72] Inventor: Austin Cartwright Mercer, Jr., Guiseley, England

[73] Assignee: Mercer Pneumatic Tools Limited

[22] Filed: Dec. 14, 1970

[21] Appl. No.: 97,908

[30] Foreign Application Priority Data

April 30, 1970 Great Britain..........20,806/70

[52] U.S. Cl. ..............................................82/38 R
[51] Int. Cl. .............................................B23q 5/22
[58] Field of Search..........214/1.1, 1.2, 1.3, 1.4, 1.5; 82/2.5, 2.7, 38 R, 38 A

[56] References Cited
UNITED STATES PATENTS

3,606,807  9/1971  Rast..............................82/38
3,253,488  5/1966  Romano.....................82/38.1

Primary Examiner—Gerald M. Forlenza
Assistant Examiner—Frank E. Werner
Attorney—Wolf, Greenfield & Sacks

[57] ABSTRACT

A device is employed in conjunction with a bar stock feed mechanism for a machine tool to support the bar stock intermediate its ends as the stock is rotated. The device utilizes a two part split collar whose parts are held closed by an over-center tension spring. The collar can be moved apart to a position in which the spring goes over-center and acts to hold the collar parts apart to allow the feed mechanism stock pusher to pass between the separated collar parts.

3 Claims, 6 Drawing Figures

PATENTED OCT 17 1972

INVENTOR
AUSTIN CARTWRIGHT MERCER Jnr.

BY
*Wolf Greenfield and Sacks*
ATTORNEYS

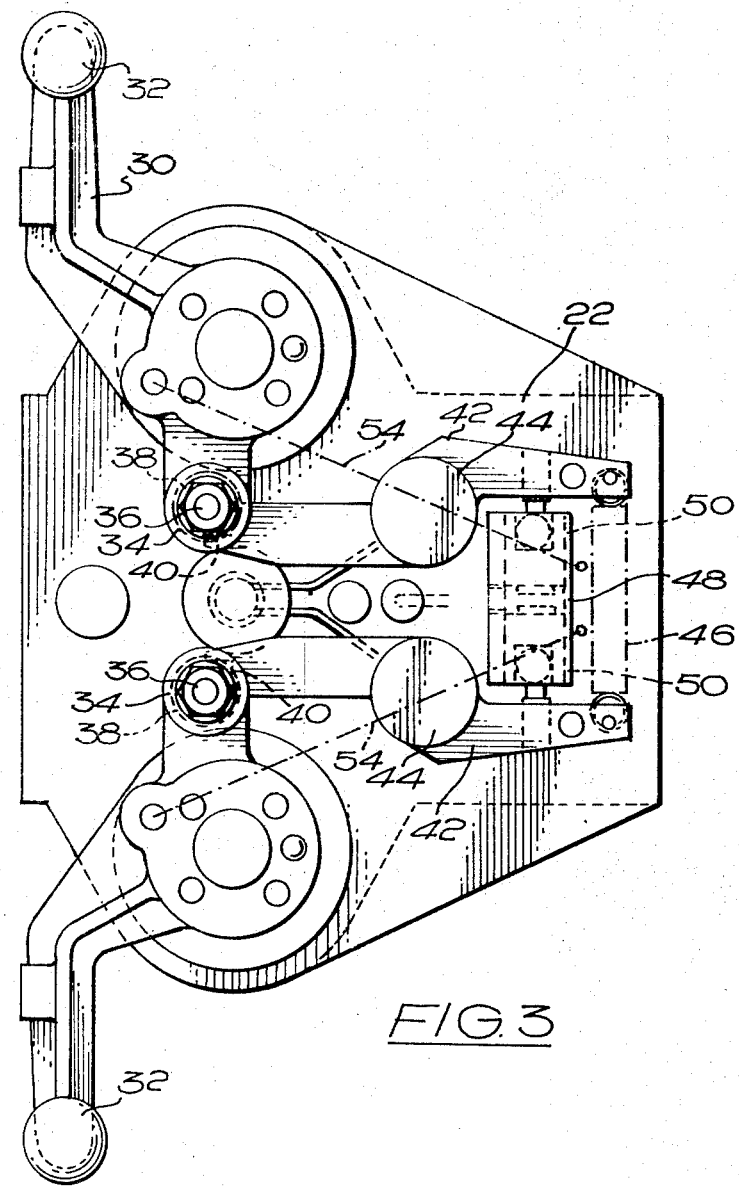

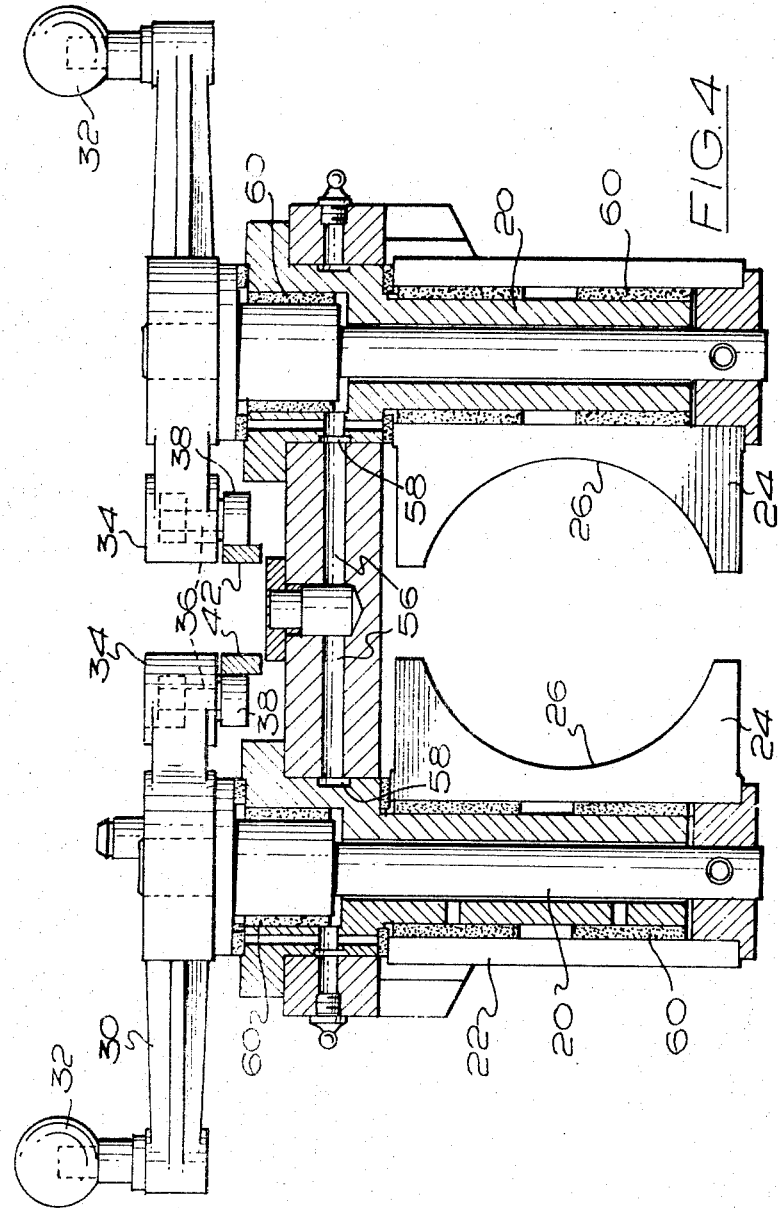

MACHINE TOOLS, PARTICULARLY A DEVICE FOR BAR FEED MECHANISM AND A BAR FEED MECHANISM

This invention relates to machine tools and in particular concerns a device for reducing the vibration and/or deflection of bar stock in a bar stock feed mechanism for a machine tool, such as a capstan or turret lathe, in which the work is rotated. The invention also relates to bar feed mechanisms incorporating such a device.

The modern trend in machine tools is for cutting speeds to be increased and this means, in a case where the machine has a bar stock feed mechanism, that the tendency is for the bar stock to be rotated faster. The increase in speed of rotation of the bar stock brings with it the disadvantage that the vibration or whip deflection of the stock is increased, the deflection being more pronounced as the cross section of the stock is decreased. To eliminate this, it has been shown to be necessary to provide some form of bearing support between the ends of the stock (in use one end of the stock is usually at the chuck of the machine tool, whilst the other end is usually engaged by the pusher of the bar stock feed mechanism). As the work is machined at the chuck, so the pusher is moved to feed fresh stock to the chuck.

One known arrangement for supporting the stock is to provide a collar of internal diameter to suit the stock within the tube along which the stock is fed to the chuck. The disadvantage of this arrangement is that when the pusher reaches the collar, it engages same and eventually pushes it into the region of, and sometimes into engagement with, the chuck, and removal therefrom, when a fresh length of stock has to be put into the mechanism, is difficult and time consuming as it must be carried out manually.

The present invention aims at providing a means of supporting bar stock between the ends thereof, as it is rotated in a bar stock feed mechanism, to reduce or eliminate, bar stock vibration and/or deflection.

According to this invention there is provided a device for reducing or eliminating vibration and/or whip deflection of bar stock as it is rotated in a bar stock feed mechanism, including means defining a collar which is for disposition around the stock to support same, said means being in two or more parts movable away from one another, said device being adapted for locating on or adjacent a bar stock feed mechanism, so that it can support a bar stock being rotated in the mechanism and so that the parts of the means defining the collar can be moved away to allow the pusher to move between the displaced parts.

Preferably, there is holding means for holding said parts in the disposition for supporting the stock.

The said parts preferably comprise two arcuate yokes or shells of the same radii, each with a replaceable support pad or bush insert for engaging the stock. The shells, when they define the collar, are preferably separated by a plane which lies at a slight incline, i.e., approximately 10° to the axis of the collar. The bush inserts may be replaceable by inserts of differing sizes, depending upon the bar stock to be supported.

The shells may be supported for pivoted or sliding movement away from and towards each other, and the holding means may be a tension spring means or a pneumatic or hydraulic cylinder means. In either case the holding means may be such as to have an over center position so that when the said shells are furthest apart the holding means acts to maintain such parts apart.

In another arrangement, the holding means is in the form of a stop for each of said shells to prevent said shell from moving away from the other shell, said stop being movable to allow the said shell to move away from the other shell, and including loading means acting to move each of said shells apart.

The invention also provides a bar stock feed mechanism with one or more devices as aforesaid. The or each device may be fitted so that it is either knocked open by the pusher, as a result of the sensing of the positions of the pusher in relation to the device.

Embodiments of devices according to the invention will now be described, by way of example, with reference to the accompanying drawings, wherein;

FIG. 3 is a plan view of the device shown in FIG. 1 with the cover removed, also to an enlarged scale;

FIG. 4 is a sectional view of the device of FIG. 1 and taken on the line IV—IV of FIG. 3;

Figure 1:
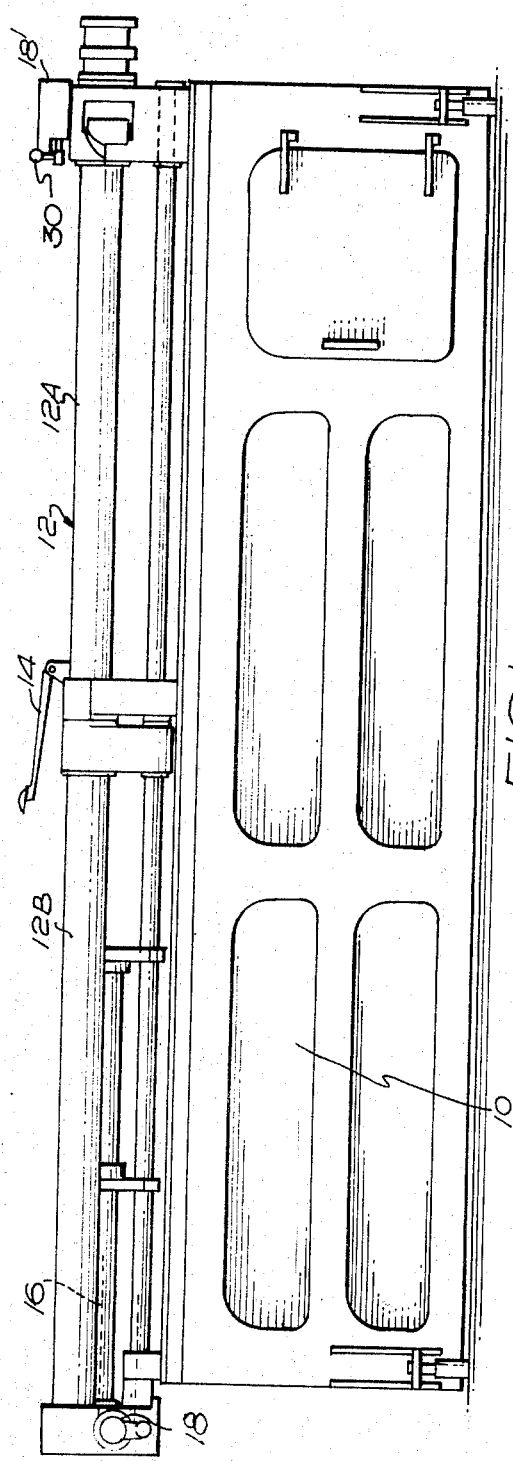
FIG. 1 is a side view of a bar stock feed mechanism with a device according to a first embodiment operatively mounted relative thereto.

Referring firstly to FIG. 1, a bar stock feed mechanism comprises a base frame 10 carrying a feed tube 12 which is in two sections 12A and 12B. The section 12B can be pivoted about an axis parallel to the tube axis to enable the bar stock to be fed into section 12A from the left hand end in FIG. 1, and when the stock has been so loaded, the section 12B is returned to the position shown in FIG. 1 and is held clamped in such position during working on the stock, by manipulation of locking handle 14 which actuates a locking mechanism. The section 12B contains a pusher which is nearly equal to the length of section 12B and its right hand end is adapted to engage the rear of the bar stock. The stock extends out of the right hand end of section 12A into the machine, such as a lathe, on which the work is to be carried out.

The pusher is moved by a fluid pressure ram through an endless chain 16 trained round sprockets such as sprocket 18 at the ends of the whole tube 12.

The device according to this embodiment is shown at 18 and is adapted to support the bar stock intermediate its end during rotation of such stock. As the bar stock is used up, the pusher is moved to the right in FIG. 1, thus presenting fresh stock to the machine. However, when the end of the pusher reaches the device 18, the need for the device is largely removed because the pusher continues to support the rear of the stock. Moreover, to continue feeding the bar stock, the bar supporting end of the pusher must move past the location of the device 18 and into the machine. Because of these considerations, the device is arranged to be rendered inoperative when the pusher reaches a predetermined position.

Figure 2:
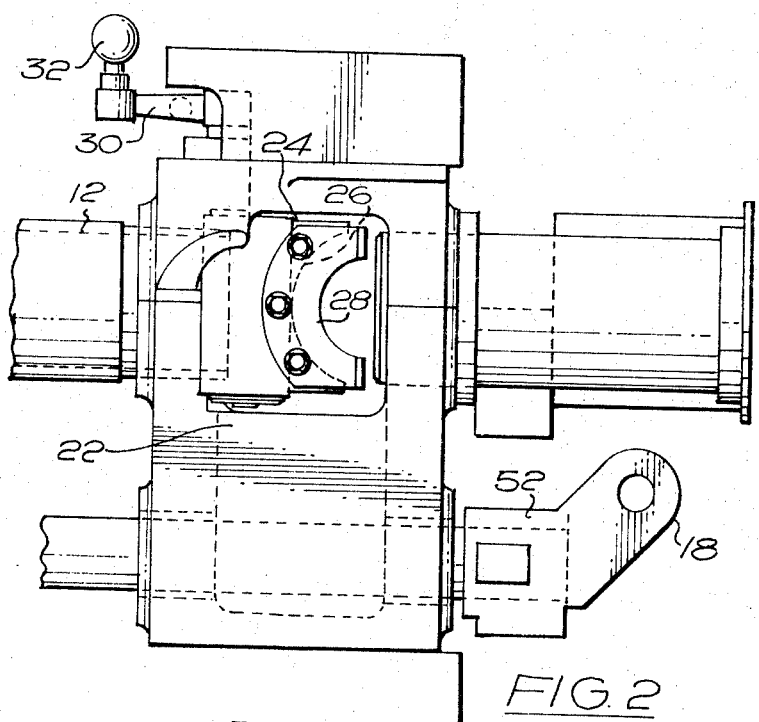
FIG. 2 is a side view of a detail shown in FIG. 1, but to an enlarged scale.

Considering now FIG. 2, in conjunction with FIG. 4, the device includes two upright spindles 20 journalled in a bearing block 22. Each spindle has secured thereto, for rotation therewith, a cheek plate 24 which has a substantially semi-circular cut out 26. The device is a symmetrical arrangement and the plates 24 can be positioned as shown in FIG. 4 in the same plane in which the cut outs 26 together define a circular aperture concentric with the axis of rotation of the bar stock in the feed mechanism, or they can be positioned as shown in FIG. 2 at approximately 90° to the FIG. 4 position in which case they are moved apart and allow the pusher to move therebetween.

As shown in FIG. 2 only, attached to each cheek plate 24 is one half 28 of a split bush, the bore of which forms the bearing surface for the bar stock during rotation thereof. These bush halves 28 are interchangeable for other halves 28 of different bore sizes to suit the bar stock being machined, and are preferably constructed from some material which is used for bearing liners, such as bronze or certain alloys. The bushes preferably house a split plane which is at a slight inclination i.e., approximately 10° to the axis of the bush as this reduces chatter between the joint of the bush halves and the rotating stock.

At the top end of each spindle 20 there is a setting handle 30 with a hand knob 32 and by means of these handles 30 the cheek plates 24 are moved to the bar stock supporting position.

Considering now FIG. 3, in detail, each handle 30 has a lug 34 from which a peg 36 extends downwardly. Rotatably carried on this peg 36 is a roller 38 which, as can be seen in FIG. 3 engages a notch stop 40 in one arm of a double armed lever 42 mounted for rotation about vertical axis 44. As the arrangement is symmetrical there are two such levers 42.

The other arms of said levers 42 are urged together by a tension spring 46 and also positioned between such arms is a fluid pressure operated ram device. This latter device comprises a cylinder 48 and two pistons 50 respectively connected to said arms.

The supply of fluid under pressure, in this case preferably air, is controlled by a valve (not shown) which is in its turn controlled by the operation of a sensing switch shown at 52 in FIG. 2. The switch is positioned for actuation by a lug carried on the chain 16, at an instant when the pusher end is approaching the plates 24. We have found that a suitable position for actuation of switch 52 is when the pusher end is approximately 1 inch from plates 26. This can be arranged easily by appropriate positioning of the actuating lug.

When the switch 52 is so actuated, and with the plates 24 in the closed position, (handles 30 as shown in FIG. 3) pressure fluid supplied to cylinder 48 causes the piston 50 to be pushed outwardly and the levers 42 to rock about their axes 44 so that notch stops 40 move out of the paths of rollers 38, and tension springs 54, indicated by lines in FIG. 3, pull the spindles 20 and cheek plates 24 round by approximately 90° in opposite directions so that the parts of the collar support of the bar stock move apart to the FIG. 2 position in which the pusher can pass through the device.

When reloading the bar feed mechanism the pusher will be withdrawn to its leftmost position in FIG. 1 the supply of pressure fluid to cylinder 48 will be cut off and the halves 28 of the bush can be closed by moving the spindles 20 by means of handles 30 back to the FIGS. 3 and 4 position, against the action of springs 54.

It will be noticed also that the device has various oil bores 56 and channels 58 to enable the bearings 60 for the spindles 20 and levers 42 to be lubricated.

In this example the springs 54 are acting to open bush halves 28 with stops 40 preventing such opening until the desired time. In another example, the springs could be acting to close the halves 28 with a fluid pressure device being actuated at the appropriate time to open the halves against spring force. Alternatively, a fluid pressure operated ram could be arranged to be double acting to hold the halves closed upon being pressurized on one side and to open the halves upon being pressurized on the other side. In yet another form there may be no springs and only a single acting cylinder which is pressurized to move the halves clear of holding catches at the appropriate instant in the cycle.

In another embodiment, the pivot axis of the halves may be remote from the halves so that such halves swing in an arcuate path of larger radius of curvature. This could provide an arrangement which might be easier to design from a mechanical engineering point of view.

From the above it will be appreciated that this invention may take many structural forms. Indeed, instead of fluid pressure operated devices, solenoids could be used.

Figure 5:
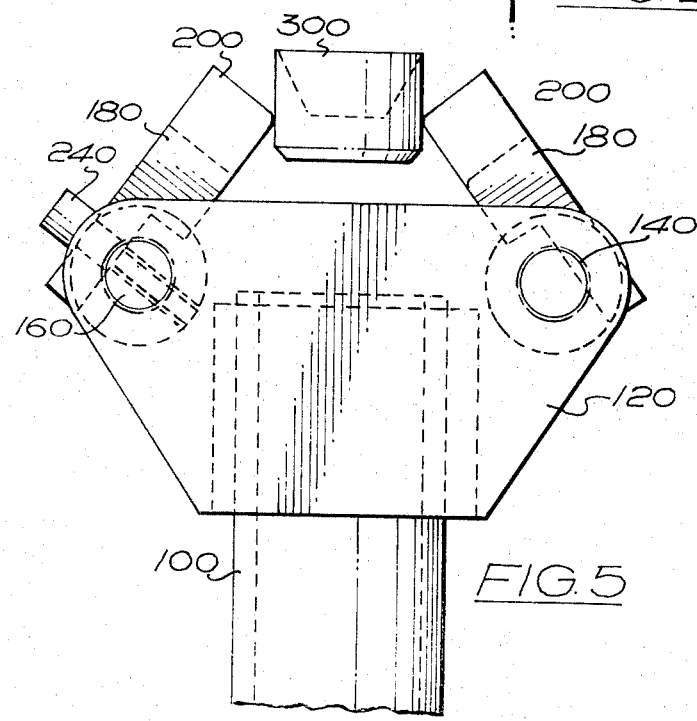

FIGS. 4 and 5 shown an embodiment wherein no fluid pressure operated rams or solenoids are used.

Figure 6:
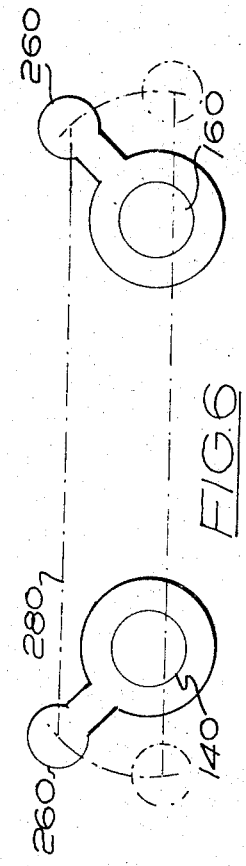
FIG. 5 is a plan view of a device according to a second embodiment of the invention and FIG. 6 is also a plan view of the device shown in FIG. 4 but showing only the spring loaded arms and the center line of the spring which loads such arms when in the two extreme positions.

Referring to FIGS. 5 and 6 the end of a section of feed tube of a bar stock mechanism is indicated at 100 and the device according to this embodiment of the invention is mounted on the end of this tube section 100. The device comprises a pair of mounting plates 120 between which extend a pair of pivot pins 140, 160, which pins in plan view respectively lie on each side of the axis of tube section 100 and are vertical. Mounted on each of the pins 140, 160 is a pivotal assembly comprising a yoke or plate 180 with a semi-circular cut-out 200 on one side thereof, the plate 200 being secured to the pin 140 or 160 by a suitable screw 240. In FIG. 5, the plates 180 are shown in the open position i.e., the position in which the semi-circular cut-outs 200 are displaced furthest from one another.

In the closed position, the plates 180 are in alignment and the two cut-outs 200 co-operate to define a circular aperture in which the bar stock is located in use.

FIG. 6 shows the means whereby the assemblies are held in one or other of said closed and open positions. Each assembly is provided with spring loading arm 260 and a tension spring 280 is connected to each of said arms 260 tending to pull same together. The arms 260 are so located in relation to the plates 180 that in the closed position the spring 280 acts to maintain the plates in such position, whereas in the open position the arms 260 go "over-center" and the spring loading then becomes such as to maintain the plates 200 in the open position.

In an actual bar feed mechanism, a further length of feed tube section connected to the machine tool would be located to the top side of the device as shown in FIG. 5 and indeed the Figure also shows the cone 300 of the pusher in the position which it occupies as it passes through the device and between the plates 200.

In operation of the embodiment described, with reference to FIGS. 5 and 6, the pusher is moved to a position furthest from the machine chuck and the plates 200, after the bar stock has been loaded into the bar feed mechanism, are pivoted into the closed position around the bar stock, the radius of the arcuate cut-outs 200 being selected to suit the size of bar stock in the feed mechanism. In this position, when the stock is rotated, the plates 180, by cut-outs 200 serve to reduce or eliminate vibration and/or whip deflection of the bar stock. The plates 180 remain in the closed position until pusher cone 300 engages such plates and forces them to spring to the open position, by virtue of the pusher cone 300 being pushed through the device by the pusher. With the device in the open position the pusher can be pushed completely therethrough and therefore the maximum possible of the bar stock is utilized.

The cut-outs 200 are lined with replaceable pads or bush inserts of any suitable size and material, depending upon the size and finish of the bar stock to be supported thereby. Examples of suitable material for the bush inserts are bronze, nylon and hardened steel. These materials can also be used for the FIGS. 1–4 embodiment for shells 28. When it is desired to change the bar stock size, the bush inserts are removed and the bush inserts of the required size are inserted to give appropriate clearance between same and the bar stock.

In each of the described embodiments, although the means defining the support aperture for the bar stock comprises two parts i.e., two shells 28 and two plates 180, the means may be made up of more than two parts and instead of the parts being pivotally mounted as shown they may be mounted for reciprocatory motion. Also the pivot assemblies may be provided with intermeshing gear segments to ensure the simultaneous pivoting of the assemblies.

The devices, because they have circular support apertures, can be used for holding bar stock of circular, square or polygonal cross-section.

One of the main advantages of the devices described is that they open automatically to allow the pusher to pass therethrough and they can be very easily re-set when the bar stock feed mechanism is re-loaded.

The benefit gained from this advantage is that the operator time required to set up the bar stock feed mechanism is minimal and is much reduced in comparison with the known methods, wherein other means are used to support the bar stock.

The devices may also be adapted for automatic closing when a fresh length of bar stock is inserted into the feed mechanism.

In the case of an exceptionally long bar feed mechanism then two or more devices according to the invention may be required.

What I claim:

1. A device for reducing or eliminating vibration and whip deflection of bar stock rotated in a bar stock feed mechanism, the device comprising
   a pair of arcuate yokes
   means supporting said yokes for pivotal movement about a pair of parallel axes whereby both said yokes can be swung to a first position where the yokes form a collar adapted to be disposed around and support the stock and can both be swung to a second position where the yokes are spaced apart to allow the bar stock feed mechanism pusher to pass between the yokes, and
   spring means secured to said yokes, said spring means being disposed on one side of the center line joining the pair of parallel axes when the yokes are in the first position and said spring means being moved over the center line when the yokes are moved to the second position whereby the spring means acts to maintain the yokes in either position.

2. The device according to claim 1, further comprising replaceable bush inserts secured to the yokes, the bush inserts engaging the bar stock to provide bearing surfaces when the yokes are in the first position.

3. A device for use with a bar stock feed mechanism of the type having a bar stock feed tube and a pusher for pushing bar stock along the inside of the feed tube in the direction of the length of the stock toward a machine tool, the device acting to reduce or eliminate vibration and whip deflection of the bar stock as it is rotated, the device comprising
   a pair of arcuate yokes,
   means supporting said yokes for pivotal movement about a pair of parallel axes whereby both said yokes can be swung together to a first position where the yokes form a collar around the stock and can both be swung to a second position where the yokes are spaced apart to permit the pusher to pass between the yokes,
   replaceable bush inserts secured to the yokes, the bush inserts providing bearing surfaces for the bar stock when the yokes are in the first position, and
   spring means extending between and secured to said yokes, said spring means being disposed on one side of the center line joining the pair of parallel axes when the yokes are in the first position and said spring means being moved to the other side of the center line when the yokes are moved to the second position whereby the spring means act to maintain the yokes in either position.

* * * * *